United States Patent
Ibaraki et al.

(10) Patent No.: US 6,434,538 B1
(45) Date of Patent: Aug. 13, 2002

(54) DATA CONTROL METHOD, FOR EMBEDDING DATA CONTROL INFORMATION, METHOD FOR DETECTING DATA CONTROL INFORMATION, DEVICE FOR EMBEDDING DATA CONTROL INFORMATION AND DEVICE FOR RECORDING DATA

(75) Inventors: Susumu Ibaraki, Sakai; Noboru Katta, Itami, both of (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/110,560

(22) Filed: Jul. 6, 1998

(30) Foreign Application Priority Data

Jul. 7, 1997 (JP) .............................. 9-181459

(51) Int. Cl.$^7$ .............................. G11B 5/86; G11B 5/09; G11B 20/10; H04N 7/167
(52) U.S. Cl. .............................. 705/57; 705/51; 705/52; 705/59; 380/5; 380/9; 380/4; 380/23; 380/25; 360/25; 360/60
(58) Field of Search .............................. 705/1, 51, 52, 705/57, 59; 380/9, 5, 25, 23; 360/60, 25

(56) References Cited

U.S. PATENT DOCUMENTS

| | | | | |
|---|---|---|---|---|
| 5,293,422 A | * | 3/1994 | Loiacono | 380/4 |
| 5,530,751 A | * | 6/1996 | Morris | 380/4 |
| 5,629,980 A | * | 5/1997 | Stefik et al. | 380/4 |
| 5,659,613 A | | 8/1997 | Copeland et al. | 380/3 |
| 5,719,937 A | * | 2/1998 | Warren et al. | 380/4 |
| 5,907,443 A | * | 5/1999 | Hirata | 360/60 |
| 5,912,972 A | * | 6/1999 | Barton | 380/23 |
| 5,923,486 A | * | 7/1999 | Sugiyama et al. | 360/60 |
| 5,960,398 A | * | 9/1999 | Fuchigami et al. | 704/270 |

FOREIGN PATENT DOCUMENTS

| | | | | |
|---|---|---|---|---|
| EP | 0328141 | * | 8/1989 | G11B/5/86 |
| EP | 0854633 | * | 7/1998 | H04N/1/32 |
| JP | 406004884 | * | 1/1994 | G11B/7/085 |
| JP | 8510856 | | 12/1996 | |
| JP | 09044994 | | 2/1997 | |
| JP | 0200018232 | * | 6/2000 | G11B/20/10 |
| WO | 9512200 | | 5/1995 | |

OTHER PUBLICATIONS

W. Bender et al.; IBM System Journal; vol. 35; No. 3 & 4; 1996; "Techniques for Data Hiding".
Search Report Japanese Application No. 10–190825; Dated Jan. 14, 1999.

* cited by examiner

*Primary Examiner*—James P. Trammell
*Assistant Examiner*—Tongoc Tran
(74) *Attorney, Agent, or Firm*—Renner, Otto, Boisselle & Sklar, LLP

(57) ABSTRACT

A data control method includes the steps of: A) at least one of the following steps: A-1) embedding prohibition information in data, wherein copying of the data is to be prohibited; and A-2) embedding the prohibition information and N pieces of permission information in the data (N is a natural number), wherein the copying of the data is to be permitted N times; and B) detecting the prohibition and/or permission information prior to the copying of the data. In the case where the permission information is detected from the data prior to the copying of the data, at least one of the N pieces of permission information in the data is invalidated, and then the copying of the data is permitted. In the case where the permission information is not detected from the data, and the prohibition information is detected from the data prior to the copying of the data, the copying of the data is prohibited.

19 Claims, 7 Drawing Sheets

DATA CONTROL METHOD, FOR EMBEDDING DATA CONTROL INFORMATION, METHOD FOR DETECTING DATA CONTROL INFORMATION, DEVICE FOR EMBEDDING DATA CONTROL INFORMATION AND DEVICE FOR RECORDING DATA

BACKGROUND OF THE INVENTION

1. Field of the Invention

The present invention relates to a method for embedding data control information for controlling the permission or prohibition to copy recorded data in order to prevent data whose copyright should be protected (e.g., an audio software, a graphic software, or the like) from being copied or processed (i.e., manipulated), and a device for realizing the method; a method for detecting such data control information, and a device for realizing the method; and a data control method in which the method for embedding data control information and the method for detecting data control information are combined.

2. Description of the Related Art

As a method for embedding copy control information in an image, or as a method for detecting copy control information, a method referred to as Patchwork is known. This method is described in "Data hiding techniques for supporting water mark (I)", Nikkei Electronics, No. 683, pp. 149–162, published in Feb. 24, 1997 (this is a translation of "Techniques for data hiding" by W. Bender, D. Gruhl, N. Morimoto, and A. Lu, IBM Systems Journal, Vol 35, NOS 3 & 4, 1996). Hereinafter, a conventional method for embedding copy control information and a conventional method for detecting such a copy control information will be described.

As the conventional method for embedding copy control information, a process for embedding a copy permission/prohibition bit (one bit) in an image will be described hereinafter. When copying is permitted, the copy permission/prohibition bit is set to be 1. When copying is prohibited, the copy permission/prohibition bit is set to be 0. Two points (i.e., Ai and Bi) are selected from the image by means of pseudo random numbers. Next, when a bit to be embedded is 1, the brightness level of Ai, i.e., Yai, is raised by an amount d, and the brightness level of Bi, i.e., Ybi, is lowered by the amount d. Conversely, when a bit to be embedded is 0, the brightness level of Ai is lowered by the amount d, and the brightness level of Bi is raised by the amount d. The value of d is an integer from 1 to 5. Such processing is repeated n times (n is generally about 10,000).

Next, the conventional method for detecting copy control information will be described. First, brightness levels (i.e. pixel information) at the same two points as those selected at the time of embedding information (i.e., (Yai+d, Ybi−d) or (Yai−d, Ybi+d)) are extracted from the image by pseudo random numbers. Next, the difference between these two points is calculated. These processing steps are repeated n times, and a mean value of the thus-obtained differences is calculated. If the mean value is equal to or greater than d, the embedded bit is considered to be 1, and if the mean value is equal to or less than −d, the embedded bit is considered to be 0. If the mean value is between −d and d, it is considered that no information is embedded.

Herein, the expected value of (Yai−Ybi) is estimated to be 0. The expected value of (Yai+d)−(Ybi−d) is 2d, and the expected value of (Yai−d)−(Ybi+d) is −2d. Accordingly, determination is performed assuming that the threshold values of displacement from the mean value of 0 are d and −d. In order to perform more accurate determination, copy control information can be detected by finding the statistical distribution of such differences, and measuring the displacement of its variance from the estimated value.

As described above, according to the conventional method for embedding copy control information and the conventional method for detecting copy control information, it is possible to embed and detect a one-bit copy permission/prohibition flag. According to another method, a constant level d is not added or subtracted in the selected pixels. Rather, information is embedded as follows. The level of embedding is changed for each of the pixels in accordance with the characteristics of its image, and such a level is respectively added to, or subtracted from, the brightness of each of the pixels so that the mean of such calculations becomes level d. As a result, it is possible to suppress the deterioration of the image after embedding the information and to make it more difficult to conduct tampering.

Therefore, the method for embedding copy control information and the method for detecting the copy control information are required not only to indicate the permission or prohibition to copy but also to control the number of allowed copies (e.g., to control the number of copies so as to limit the number of copies made to N). In order to control the number of copies, it is necessary to rewrite copy control information upon copying. For example, in the case of a software whose copying is permitted only once, the copy control information indicating that copying is permitted once is embedded in the software. Upon copying the software, the copy control information must be replaced by new copy control information indicating copying is prohibited.

In order to realize such rewriting of copy control information by the conventional method for embedding copy control information and the conventional method for detecting the copy control information, both of these methods must be executed when a user makes a copy. Since the conventional method for embedding copy control information is hard to process as compared to the method for detecting the copy control information, its realization by a user leads to an increase in cost. In addition, since the method for embedding copy control information is disclosed to the user, there exists a possibility that tampering can be carried out rather easily.

SUMMARY OF THE INVENTION

According to one aspect of this invention, a data control method includes the steps of: A) at least one of the following steps: A-1) embedding prohibition information in data, wherein copying of the data is to be prohibited; and A-2) embedding the prohibition information and N pieces of permission information in the data (N is a natural number), wherein the copying of the data is to be permitted N times; and B) detecting the prohibition and/or permission information prior to the copying of the data. In the case where the permission information is detected from the data prior to the copying of the data, at least one of the N pieces of permission information in the data is invalidated, and then the copying of the data is permitted. In the case where the permission information is not detected from the data, and the prohibition information is detected from the data prior to the copying of the data, the copying of the data is prohibited.

In one embodiment of the present invention, the permission information is a digital signature f(M); and the digital signature f(M) is derived based on a digital code M which is extracted from the data.

According to another aspect of this invention, a method for embedding data control information includes one of the following steps of: embedding prohibition information in data, wherein copying of the data is to be prohibited; and embedding the prohibition information and N pieces of permission information in the data in the data (N is a natural number), wherein the copying of the data is to be permitted N times.

In one embodiment of the present invention, the permission information is a digital signature f(M) for a digital code M which is uniquely derived from the date.

According to still another aspect of this invention, a method for detecting data control information includes the step of detecting predetermined permission and/or prohibition information prior to copying of data. In the case where the predetermined permission information is detected from the data prior to the copying of the data, the predetermined permission information is invalidated so as to permit the copying of the data. In the case where the predetermined permission information is not detected from the data, and the predetermined prohibition information is detected from the data prior to the copying of the data, the copying of the data is prohibited.

According to still yet another aspect of this invention, a method for detecting data control information includes the step of authenticating a digital signature f(M) in data based on a digital code M which is derived from data. In the case where the digital signature f(M) in the data is authenticated prior to copying of the data, the copying of the data is permitted. In the case where the digital signature f(M) in the data is not authenticated prior to the copying of the data, the copying of the data is prohibited.

According to still yet another aspect of this invention, a device for embedding data control information includes: a section for embedding prohibition information, which embeds prohibition information indicating at least a prohibition against copying of data in the data; and a section for embedding permission information, which embeds N pieces of permission information in the data along with the embedding of the prohibition information by the section for embedding prohibition information in the case where the copying of the data is to be permitted N times, wherein N is a natural number.

In one embodiment of the present invention, the section for embedding permission information has a code extracting section for extracting a digital code M from the data.

In another embodiment of the present invention, the section for embedding permission information includes: a signature section for generating a digital signature f(M) based on the digital code M which is extracted by the code extracting section and a first public key held by a producer of the data; and a signature embedding section for embedding the digital signature f(M) generated by the signature section in the data as the permission information.

According to still yet another aspect of this invention, a device for detecting data control information which extracts prohibition information and permission information embedded in data includes: a permission information detecting section for detecting the permission information from the date; a permission information invalidating section for invalidating the permission information in the data; a prohibition information detecting section for detecting the prohibition information from the data, and a determining section which sets a copy permission/prohibition flag to be in a copy permissive state and then outputs the flag in the case where the permission information is detected by the permissive information detecting section, and sets the copy permission/prohibition flag to be in a copy prohibited state and the n outputs the flag in the case where the permission information is not detected by the permission information detecting section, and the prohibition information is detected by the prohibition information detecting section.

In one embodiment of the present invention, the permission information detecting section has a code extracting section for extracting a digital code M from the data.

In another embodiment of the present invention, the permission information detecting section includes: a signature extracting section for extracting a digital signature f(M) which is embedded in the data; and an authentication section which generates a digital signature f(M) based on the digital code M extracted by the code extracting section and a second public key, compares the generated digital signature f(M) with the digital signature f(M) extracted by the signature extracting section, and validates a copy permission flag and outputs the flag if the digital signature f(M) is authenticated.

According to still yet another aspect of this invention, a device for recording data on a recording medium includes: a permission information detecting section for detecting the permission information from the data; a permission information invalidating section for invalidating the permission information in the data; a prohibition information detecting section for detecting the prohibition information from the data; and a determining section which sets a copy permission/prohibition flag to be in a copy permissive state and then outputs the flag in the case where the permission information is detected by the permission information detecting section, and sets the copy permission/prohibition flag to be in a copy prohibited state and then outputs the flag in the case where the permission information is not detected by the permission information detecting section, and the prohibition information is detected by the prohibition information detecting section; and a data recording section which records the data in the case where the copy permission/prohibition flag is set to be in the copy permissive state by the determining section, and does not record the data in the case where the copy permission/prohibition flag is set to be in the copy prohibited state by the determining section.

In one embodiment of the present invention, the permission information detecting section has a code extracting section for extracting a digital code M from the data.

According to still yet another aspect of this invention, a date control method includes the steps of: A) at least one of the following steps: A-1) embedding prohibition information in data, wherein processing of the data is to be prohibited; and A-2) embedding the prohibition information and N pieces of permission information in the data (N is a natural number), wherein the processing of the data is to be permitted N times; and B) detecting the permission and/or prohibition information prior to the processing of the data. In the case where the permission information is detected from the data prior to the processing of the data, at least one of the N pieces of permission information in the data is invalidated, and then the processing of the data is permitted. In the case where the permission information is not detected from the data, and the prohibition information is detected prior to the processing of the data, the processing of the data is prohibited.

According to still yet another aspect of this invention, a method for embedding data control information includes one of the following steps of: embedding prohibition information in data, wherein processing of the data is to be prohibited; and embedding the prohibition information and N pieces of permission information in the data (N is a natural number), wherein the processing of the data is to be permitted N times.

According to still yet another aspect of this invention, a method for detecting data control information includes the following step of: detecting predetermined permission and/or prohibition information prior to processing of data. In the case where the predetermined permission information is detected from the data prior to the processing of the data, the predetermined permission information is invalidated so as to permit the processing of the data. In the case where the predetermined permission information is not detected from the data, and the predetermined prohibition information is detected from the data prior to the processing of the data, the processing of the data is prohibited.

According to still yet another aspect of this invention, a device for embedding data control information includes a section for embedding prohibition information, which embeds prohibition information indicating prohibition against processing of data in the data; and a section for embedding permission information, which embeds N pieces of permission information in the data along with the embedding of the prohibition information by the section for embedding prohibition information in the case where the processing of the data is to be permitted N times, wherein N is a natural number.

According to still yet another aspect of this invention, a device for detecting data control information which extracts prohibition information and permission information embedded in data includes: a permission information detecting and deleting section which, in the case where N pieces of permission information (N is a natural number) are detected from the data, invalidates at least one of the N pieces of permission information in the data, validates a permission flag, and outputs the flag; a prohibition information detecting section which validates a prohibition flag and outputs the flag in the case where the prohibition information is detected from the data; and a determining section which sets a permission/prohibition flag to be in a permissive state and then outputs the flag when the permission flag is valid or the prohibition flag is not valid, and sets the permission/prohibition flag to be in a prohibited state and then outputs the flag when the permission flag is invalid and the prohibition information is valid.

Thus, the invention described herein makes possible the advantages of providing a method for embedding data control information which can control not only the permission or prohibition to copy, but also control the number of copies, and which makes it more difficult to conduct tampering, and a device for realizing the same; a method for detecting the data control information, and a device for realizing such a method; a method for embedding data control information which limits manipulation of data or data processing of displayed contents or the like, and a device for realizing such a method; and a method for detecting the data control information, and a device for realizing such a method.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but non-limiting examples with reference to the accompanying drawings.

Embodiment 1

Figure 1A:
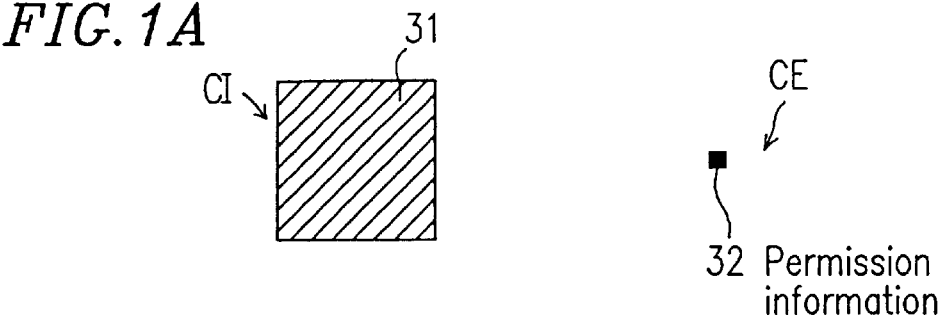
FIGS. 1A to 1D are views for describing the summary of a data control method according to Embodiment 1 of the present invention.
Figure 1B:
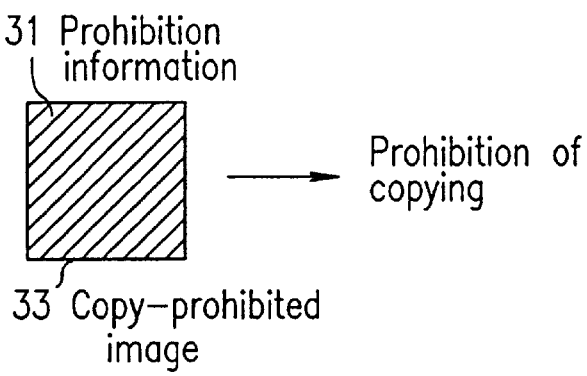

Hereinafter, a data control method according to Embodiment 1 of the present invention will be described with reference to FIGS. 1A to 1D, 2, 3, 4, and 5. FIGS. 1A to 1D are views for describing the summary of the data control method in Embodiment 1. The term "data control" as used in Embodiment 1 of the present invention refers to copy control. As shown in FIG. 1A, a signal CI is a signal dispersed over the entire image, and indicates copy prohibition information 31 (FIG. 1B). A signal CE is a signal inserted in a predetermined position of the image, and indicates information 32 which permits the making of one copy (hereinafter, referred to as a "one-time-copy-permitting information"). In the case where copying is permitted N times, the number of permission information 32 inserted in the image is N.

The signal CI is dispersed over the entire image, and thus the signal CI is not visible. On the other hand, the signal CE is inserted at a predetermined corner at the image, and the signal CE may be visible or invisible.

Figure 1C:
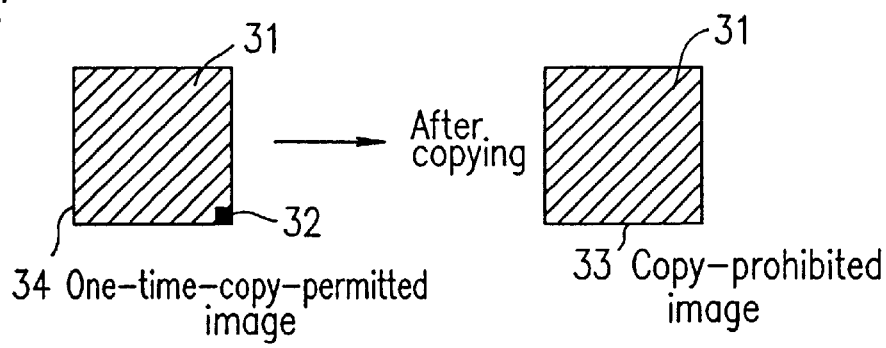
Figure 1D:
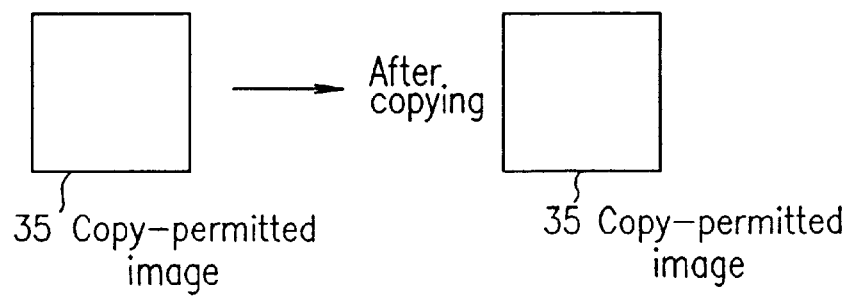

FIG. 1B shows an image 33 whose copying is prohibited (hereinafter, referred to as a "copy-prohibited image"). FIG. 1C shows an image 34 whose copying is permitted once (hereinafter, referred to as a "one-time-copy-permitted image"). A piece of the permission information 32 is inserted in the lower right corner of the image. FIG. 1D shows an image 35 whose copying is permitted (hereinafter, referred to as a "copy-permitted image"), and no prohibition information 31 is inserted over the entire image.

The copy control according to Embodiment 1 of the present invention is intended to perform output control of an image signal in accordance with three kinds of states, i.e., a copy-free state, a N-times-copy-permitted state in which copying is permitted N times (in the description hereinafter, N=1), and a copy-prohibited state. In the copy-free state (i.e., copying is permitted), copying is unconditionally permitted. In the one-time-copy-permitted state, coping is permitted only once. In the copy-prohibited state, no is permitted although displaying the image is allowed.

For the copy-prohibited image 33, the prohibition information 31 is embedded as shown in FIG. 1B. When the copy-prohibited image 33 is input to a device for recording data, the permission information 32 is not detected, whereas the prohibition information 31 is detected. In such a case, copying of the image 33 is prohibited.

For the one-time-copy-permitted image 34, both of the prohibition information 31 and the permission information 32 are embedded as shown in FIG. 1C. If the permission information 32 is detected prior to the copying of the image 34, copying of the image is permitted. The device for recording data deletes the permission information 32 of the image 34 which had been transmitted from a transmitting medium to the device for recording data, and starts copying the image 34. Regarding the deletion of the permission information 32, the entire permission information 32 may be deleted, or part of the permission information 32 may be deleted. The purpose of such deletion is to make the permission information impossible to be detected as the permission information 32, i.e., to invalidate the permission information. For example, in the case where the permission information 32 has an 8-bit format, one bit of such information may be deleted or all of the 8-bit of the information may be deleted. Alternatively, in the case where the permission information 32 is structured by the combination of two pieces of information, one of the two pieces of the information may be deleted.

Since only the permission information 32 is removed from the image after copying, the prohibition information 31 is left behind, thereby changing the image to the copy-prohibited image 33.

However, in the case of the N-time-copy-permitted-image in which N pieces of the permission information (N is 2 or greater) are embedded, one of the N pieces of the permission information is deleted. As a result, the image becomes an (N=1)-time-copy-permitted image.

For the copy-free image 35, at least the prohibition information 31 is not embedded. When the copy-free image 35 is copied, since the prohibition information 31 is not detected, copying is permitted unconditionally.

According to the copy control method as described above, it is possible to realize control such that copying is permitted N times only, in addition to controlling copy prohibition and permission. Moreover, it is not necessary to disclose the method for embedding the prohibition information or the method for deleting the prohibition information upon copying. Thus, this makes it difficult for an unauthorized party to delete the prohibition information. Furthermore, since the permission information is not embedded upon copying, there is no need for disclosing the method for embedding permission information. Therefore, it is impossible for the unauthorized party to embed permission information. Although the prohibition information is embedded across the entire image according to the description made with reference to FIGS. 1A to 1D, the prohibition information may be embedded in a certain position in the image. Moreover, the permission information is embedded in a predetermined position of the image as described above in relation to FIGS. 1A to 1D. However, in the case where the permitted number of copies is limited to 1, i.e., N=1, the permission information may be embedded across the entire image.

Next, a method for embedding data control information and a method for detecting data control information, which are fundamental techniques for realizing the data control method according to Embodiment 1 of the present invention, will be described with reference to FIGS. 2 to 5.

Figure 2:
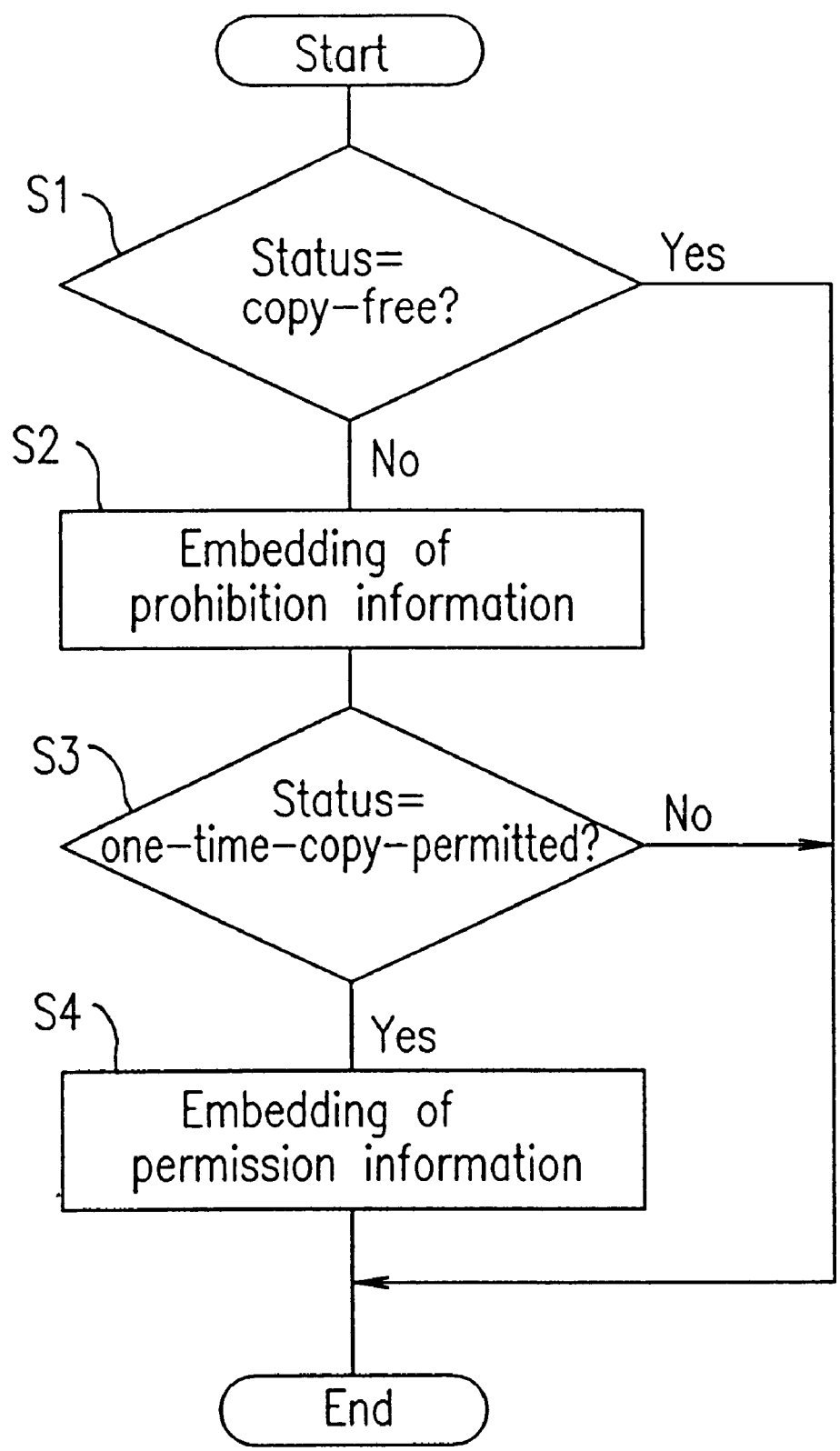
FIG. 2 is a flow chart showing a method for embedding data control information according to Embodiment 1 of the present invention.
Figure 4:
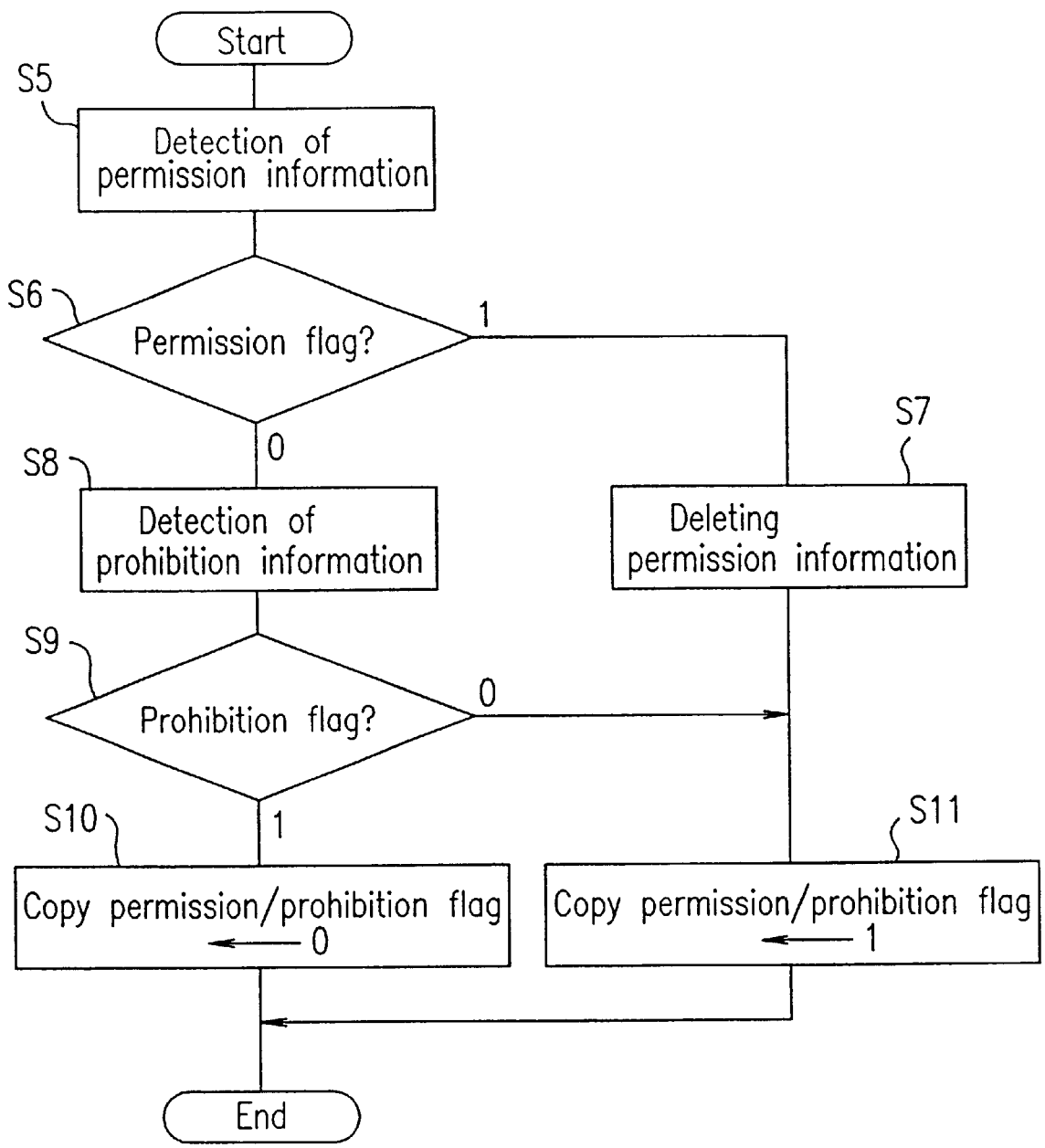
FIG. 4 is a flow chart showing a method for detecting data control information according to Embodiment 1 of the present invention.

FIG. 2 is a flow chart for illustrating the method for embedding data control information according to Embodiment 1 of the present invention. FIG. 4 is a flow chart for illustrating the method for detecting data control information according to Embodiment 1 of the present invention.

According to the method for embedding data control information shown in FIG. 2, a variable Status which indicates one of three states, i.e., (1) a copy-prohibited state; (2) a one-time-copy-permitted state; and (3) a copy-free state, is set first. In step S1, it is determined whether the variable status indicates copy-free state or not. In the case where the variable status indicates the copy-free state, the process is terminated. In the case where the variable status does not indicate the copy-free state, the process goes on to a step S2. In the step S2, the prohibition information 31 is embedded in an image.

Such an embedding process may be any method for embedding information of one bit or more in an image (e.g., the conventional method for embedding copy control information). In particular, it is more preferable that the method for embedding copy control information is more complicated than the method for detecting the copy control information. Under such a restriction, the effects of the present invention are not ruined by the embedding method. Such a method for embedding information in an image is refereed to as Water Mark, and a large number of methods, including the method described in the "DESCRIPTION OF THE RELATED ART", are known. For example, a method introduced in "Water Mark protects multi-media generation" (Nikkei Electronics, published in Feb. 24, 1997) is known. At the next step S3, it is determined whether or not the variable Status indicates the one-time-copy-permitted state. In the case where the variable Status does not indicate the one-time-copy-permitted state, the process is terminated. In the case of the one-time-copy-permitted state, the process goes on to a step S4.

At step S4, the permission information 32 is embedded in the image. Step S4 is a process, for example, as shown in the flow chart of FIG. 3. Hereinafter, the process for embedding the permission information at the step S4 will be described in detail with reference to FIG. 3.

At step S21, from pixels of an image or pixels of images in which information is to be embedded, a code M which uniquely corresponds to the image is extracted. The extraction of the code M can be realized, for example, by a method in which k predetermined pixels (k is an integer) are selected from the image, and the MBS (i.e., most significant bit) of the data in these pixels is set to be the code M of k bits. However, the process for extracting the code M is not limited thereto. For example, a method in which k blocks each having 8×8 pixels are selected from the image, and the brightness values of these blocks is set to be the code M of k bits, a method in which a frequency component in the image is calculated, and low frequency components thereof are used as the code M, or the like may be employed. Any extraction method may be employed as long as the method can uniquely extract digital data from the image.

At a next step S22, a digital signature f(M) is produced using the code M. Hereinafter, the digital signature will be described in details.

Herein, it is assumed that a user A is a sender of an image and a user B is a receiver of the image. Then, the case where the code M of the image is converted to the signature C (C=f(M)), and the signature is transmitted from user A to user B is considered. User A produces the signature C and then transmits the image with the signature C. User B authenticates the signature C, i.e., verifies whether the signature is valid or not.

Any digital signature can be used in Embodiment 1 of the present invention as long as the signature satisfies the following conditions:

(1) user B can readily authenticate the signature C, and (2) user A can easily produce the signature C, but it is difficult for a person other than the user A to produce the signature C.

Specific examples of such a digital signature method include a method utilizing public key cryptography. User A prepares a signature function D (i.e., a first public key) as a function for performing the signature, and prepares an authentication function E (i.e., a second public key) as a function for performing authentication. Herein, the authentication function E is set to be an inverse function of the signature function D. User A uses the signature function D so as to produce the signature C from the code M according to the equation C=D(M). User B uses the authentication function E so as to verify whether or not E(C) is identical with M. Specifically, since the authentication function E is the inverse function of the signature function D, if C is the valid signature, the relationship such that E(C)=E(D(M))=M is satisfied. On the other hand, if the signature C is not valid, E(C) is not identical with M.

According to this public key cryptography, a mechanism such that the secret digital function D is difficult to derive from the disclosed authentication function E is realized by using a mathematical technique. Such examples include mechanisms utilizing RSA cryptograph, Elgamal cryptograph, and the like. According to the RSA cryptography, the signature function D is defined by the following expression (1).

$$D(M)=M^d \bmod n \tag{1}$$

The authentication function E is defined by the following expression (2).

$$E(C)=C^e \bmod n \tag{2}$$

The term "mod n" herein refers to a remainder operation by n, i.e., a remainder, which is an integer, resulting from the division by n.

The terms "n", "e", and "d" in the above expressions (1) and (2) are selected such that E becomes the inverse function of D. Specifically, they are selected so as to satisfy the following expression (3).

$$E(C) = C^e \bmod n = (M^d)^e \bmod n \tag{3}$$
$$= M^{de} \bmod n = M$$

User a prepares large prime numbers p and q, and sets that n=p×q. Next, Euler's function $\phi(n)$, which is (p−1)×(g−1)= $\phi(n)$, is defined. Thereafter, an integer e which constitutes a prime number with the function $\phi(n)$ is suitably set. Specifically, the greatest common divider of $\phi(n)$ and e is 1. Next, d is determined so as to satisfy the following expression (4).

$$e \times d \bmod \phi(n)-1 \tag{4}$$

By using the thus-determined e and d, aforementioned expression (3) is satisfied.

User A discloses n and e, and keeps d, p, and q secret. Accordingly, the authentication function E is disclosed, and the signature function D is kept secret. User A who knows p and q can derive d from e using expression (4). For user B who does not know p and q, however, it is difficult to derive d from n and e.

To facilitate an understanding of the above, a very simple numerical example will be described hereinafter. For example, if p=5 and q=11 are selected as prime numbers. Then, n=55 and $\phi(n)$=40 are obtained from the aforementioned equations n=p×q and (p−1)×(q−1)=$\phi(n)$. Next, if e=7 is selected, 7×23 mod 40=1 is obtained from the aforementioned expression (4). Thus, d is 23. User A discloses n=55 and e=7, and keeps p=5, q=11, and d=23 secret.

The signature for M=42, for example, will be calculated as in the following expression (5).

$$D(M)=42^{23} \bmod 55=3 \tag{5}$$

Accordingly, C equals 3. Using the disclosed authentication function, user B performs the calculation of the following expression (6).

$$E(C)=3^7 \bmod 55=42 \tag{6}$$

Consequently, since E(C) equals the original number of M, i.e., M=42, it is authenticated that the signature is valid.

For the purpose of simplification, small values are selected as prime numbers p and q which constitute n in the above-described numerical example. In reality, however, in order to enhance the security of cryptograph, n has the size of about 512 bits. Even if the values of p and q are assumed to have a bit width of 256, the value of n is enormous, i.e., the value of n has about 77 to 78 digits in terms of decimal number system.

The aforementioned description concerns the digital signature using public key cryptography. However, a digital signature based on a knapsack problem, a digital signature using zero knowledge proof, and the like are known, and described in "Cryptography and information security" written by Tujii and Kasahara (published by Shoukoudou in 1990).

With reference to the flow charts shown in FIGS. 2 and 3 again, description of the method for embedding data control information according to Embodiment 1 will be continued hereinafter. After the digital signature f(M) is produced using the code M at step S22 in FIG. 3, the signature f(M) is embedded in the image at step S23. As a method for embedding the signature f(M) in the image, there is a method in which the signature is embedded in the edge of the image using a visible pattern such that 0 is represented by white color and 1 is represented by black color. However, the present invention is not limited to such a method. Any signature embedding method may be employed as long as the method embeds a code having a plurality of bits. For example, a method in which LSB (i.e., the least significant bit) of a pixel selected from the image is replaced with the signature f(M), a method in which the signature f(M) is embedded between blanking areas of the image, a method using Water Mark which can be easily deleted, or the like may be used.

Since such a process for embedding permission information uses the digital signature based on the code M which can be uniquely derived from the image as the permission information, it is difficult for a third party to produce the identical signature without having the private key d. Thus, it is impossible to newly embed permission information.

According to the method for embedding copy control information in Embodiment 1 of the present invention, in the case of copy-free image, nothing is embedded in the image. In the case of one-time-copy-permitted image, the prohibition information and a piece of permission information are embedded in the image. In the case of copy-prohibited image, only the prohibition information is embedded in the image.

Next, with reference to FIG. 4, a method for detecting data control information (i.e., detecting copy control information) from an image according to Embodiment 1 of the present invention will be described.

Figure 5:
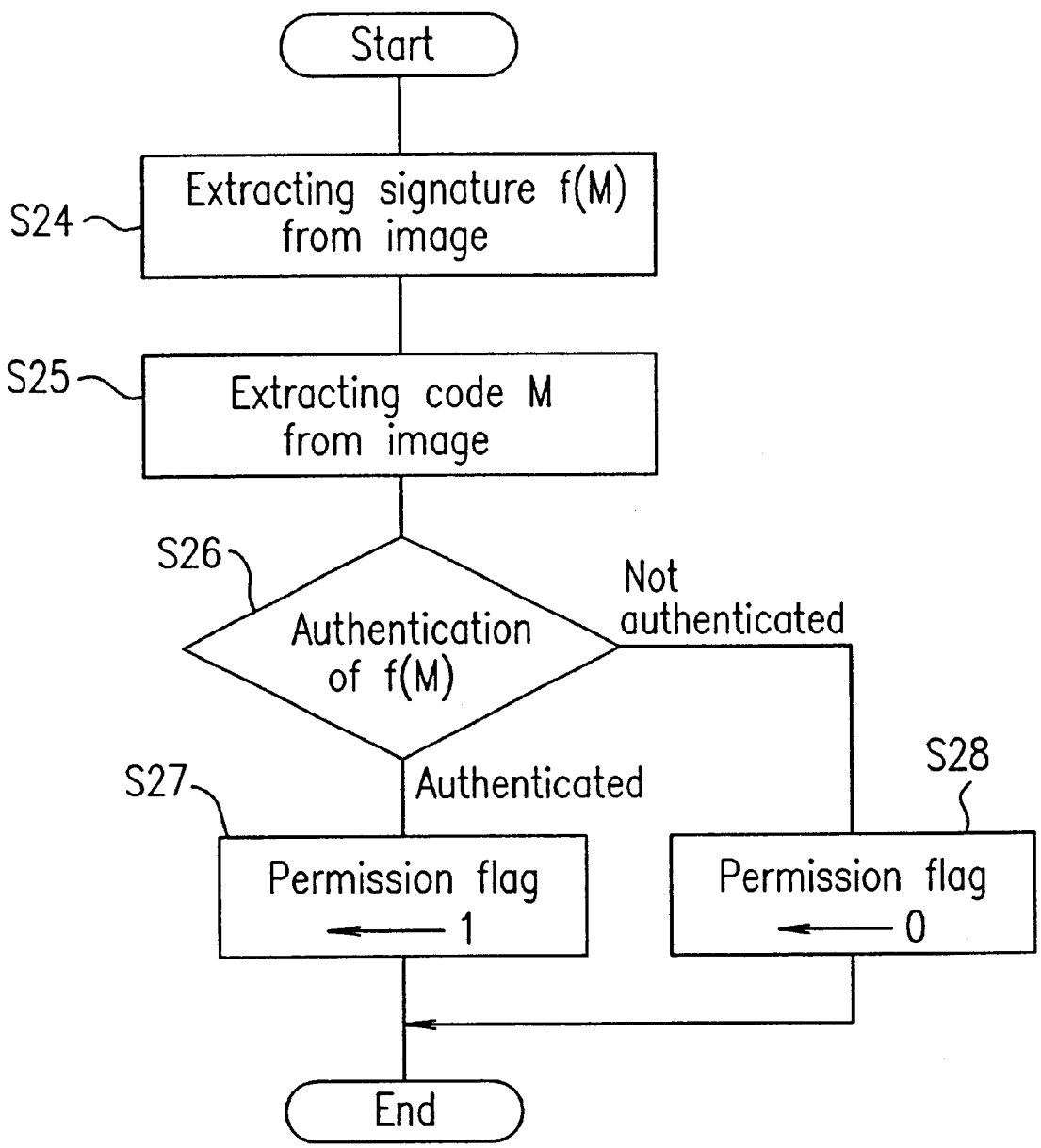
FIG. 5 is a flow chart showing a process in the method for detecting data control information shown in FIG. 4.

First, at step S5, the permission information 32 is detected from an image. Step S5 is a process, for example, as shown in the flow chart of FIG. 5. With reference to FIG. 5, the process for detecting the permission information at step S5 of FIG. 4 will be described in detail hereinafter.

At a step S24 in FIG. 5, the signature f(M), which is embedded in the image, is detected. In next step S25, the code M is extracted from the image. In order to extract the code M, the same process as that used for extracting the code M at step S21 in FIG. 3 may be employed.

Figure 3:
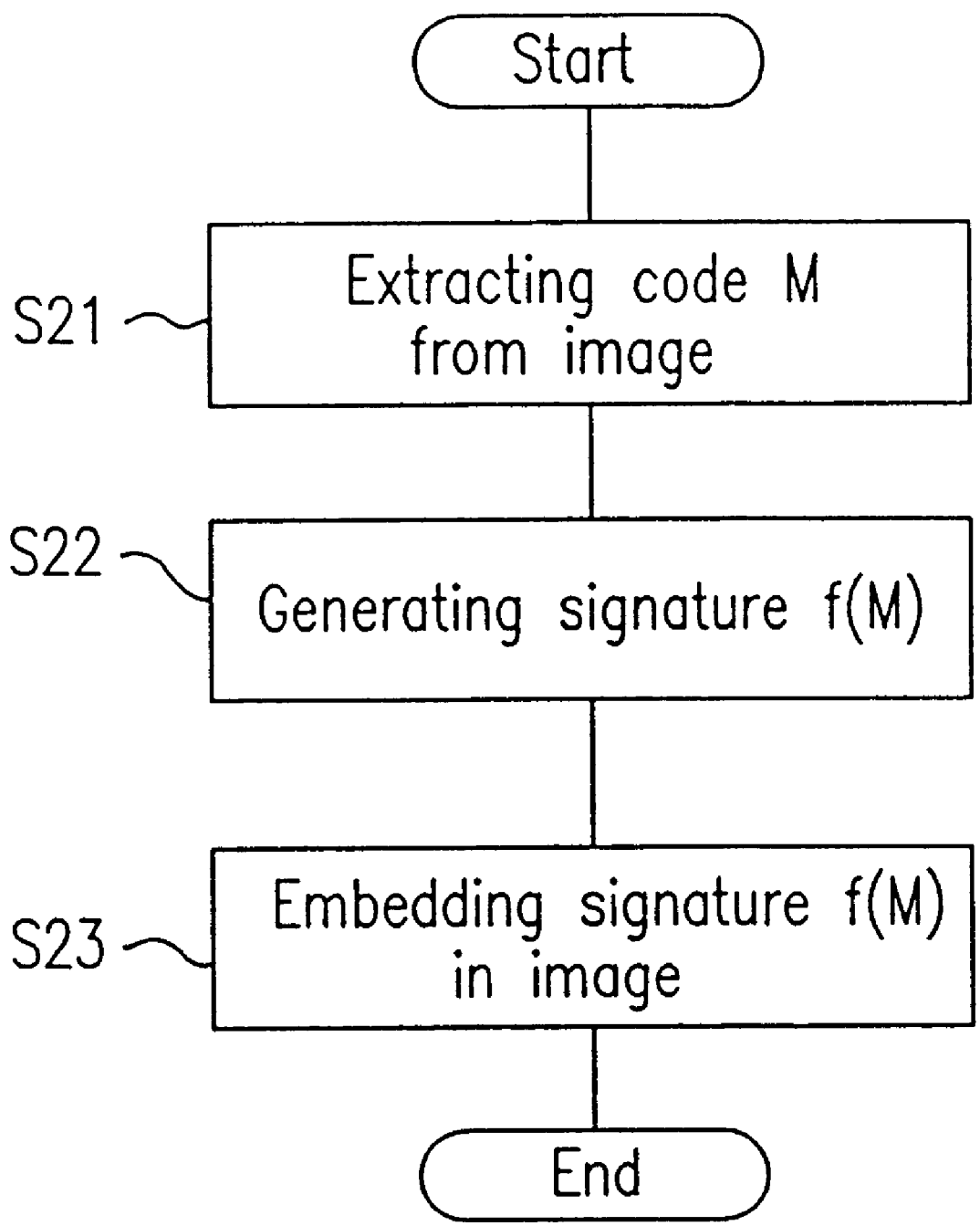
FIG. 3 is a flow chart showing a process in the method for embedding data control information shown in FIG. 2.

At a next step S26, authentication of the digital signature is performed. At this time, the signature produced at step S22 in FIG. 3 is authenticated. In the case of the authentication for the RSA cryptograph, for example, the disclosed information n and the public Key e are used. If the signature f(M) is assumed to be C, the function for authenticating the signature is represented by the aforementioned expression (2). If the result equals M as shown in the aforementioned expression (3), the signature is authenticated. On the other hand, if the result is not identical with M, the signature is not authenticated.

The fact that the signature is authenticated indicates that the permission information is embedded. Therefore, the process goes on to step S27 and 1 is substituted for a permission flag. The fact that the signature is not authenticated at step S26 indicates no permission information is embedded. Therefore, the process goes on to step S28 and 0 is substituted for the permission flag. Although the permission flag is produced in the manner as described above in Embodiment 1 of the present invention, any signal may be used as long as the signal can identify the state where the permission information is embedded and the state where the permission information is not embedded.

After the permission information is detected in step S5 in FIG. 4 as described above, the process goes on to a step S6, and the determination of the permission flag is performed. If the permission flag is 1, the process goes on to a step S7. If the permission flag is 0, the process goes on to a step S8. At step S7, the permission information is deleted. The deletion of the permission information is a process for removing the permission information which had been embedded in step S4 in FIG. 2 from the image. Herein, at least part of the permission information is deleted as described above. After the process at step S7 is completed, the process goes on to a step S11, and a copy permission/prohibition flag is set to be 1.

At step S8, the prohibition information is detected. The detection herein refers to the detection of the prohibition information which had been embedded at step S2 in FIG. 2. In the case where the prohibition information is detected, the prohibition flag is set to be 1. In the case where no prohibition information is detected, the prohibition flag is set to be 0. Thereafter, the process goes on to step S9, and the determination of the prohibition flag is performed. If the prohibition flag is 1, the process goes on to step S10. If the prohibition flag is 0, the process goes on to step S11. A method for generating the prohibition flag is not limited to the above-described method. Any signal may be used as the prohibition flag as long as the signal can identify the state where the prohibition information is embedded and the state where the prohibition information is not embedded.

At step S10, the copy permission/prohibition flag is set to be 0, and at step S11, the copy permission/prohibition flag is set to be 1. Herein, the copy permission/prohibition flag is a signal such that 0 represents the prohibition of copying and 1 represents the permission of copying. Any form of the copying permission/prohibition flag can be employed as long as the signal can identify the prohibition of copying and the permission of copying.

According to the method for detecting data control information according to Embodiment 1 of the present invention, copying of the image in which the permission information is embedded is not permitted after the permission information is deleted. For the image in which neither the permission information nor the prohibition information is embedded, copying of the image is permitted. For the image in which no permission information is embedded and the prohibition information is embedded, copying of the image is prohibited.

As described above, the change from the one-time-copy-permitted state to the copy-prohibited state is realized by a means of the embedding and deleting of the permission information. Moreover, the embedding of the permission information is based on the digital signature. Accordingly, the deletion or detection of the permission information can be easily performed. However, for a person who does not know the private key d, it is difficult to embed permission information. Therefore, it is difficult to change (i.e., rewrite) a copy-prohibited state to a copy-permitted state in an unauthorized manner. Furthermore, the prohibition information is embedded by using a method different from the embedding method of the permission information. As a result, it is only necessary to disclose or provide the detecting method to user B. Thus, user A can keep the embedding or deleting method secret.

According to Embodiment 1 of the present invention, in addition to controlling for the prohibition and permission to copy, it is possible to realize such control that copying is permitted only once. Therefore, it is possible to realize a data control method, or a method for embedding data control information and a method for detecting the data control information, which make tampering more difficult to conduct as compared to the conventional method.

In Embodiment 1 of the present invention, the method which realizes control such that copying is permitted only once is described. However, it is also possible to realize control such that copying is permitted N times by embedding N pieces of the permission information (N is an integer greater than or equal to 2) upon embedding copy control information, and deleting only one piece of permission information regardless of the number of pieces of permission information found upon detection.

In the above description, a data control method which prohibits copying, a data control method which permits copying once, and a data control method which permits copying N times are described. However, the present invention is not limited thereto. Similarly, it is also possible to realize, for example, control such that the reproduction of an image is prohibited, the reproduction of an image is permitted once, or the reproduction of an image is permitted N times; control for data processing such as editing or manipulation of an image; or control for the display of an image.

Moreover, although the image signal is the subject for the processing according to Embodiment 1 of the present invention, an audio signal or a document may be subjected to such processing as well. In such a case, the same effects as those described above can be obtained.

Furthermore, although the digital signature based on the code M which can be uniquely derived from an image is used as the permission signal in Embodiment 1, the present invention is not limited thereto. Any embedding method may be used. Specifically, without disclosing the method for embedding the permission information to user B, only the deletion method and the detection method are disclosed to user B. If a method in which the embedding method cannot be guessed from the deletion method or the detection method, a method in which the calculation amount of the embedding process is greater than that of the deletion or detection process, a method using a large complicated circuit, or the like is employed, it is possible to further increase tamper resistance. By producing the permission information based on the code M which can be uniquely derived from the image, the image can have one-to-one correspondence with the permission information. This makes unauthorized production of the permission information difficult.

Other examples of the method for embedding the permission information include a method in which permission information consists of a first piece of permission information and a second piece of permission information; and the first piece of permission information is embedded in an image using a first embedding method, and the second piece of permission information is simultaneously embedded in the image using a second embedding method. Herein, an embedding method which makes the deletion of the embedded information difficult to perform, i.e., the same method as used for embedding the prohibition information, is used as the first embedding method. On the other hand, a method in which the permission information is visibly embedded in the edge of the image and thus the deletion thereof can be easily performed is used as the second embedding method. Regarding the copying of the image, only when both of the first piece of permission information and the second piece of permission information are detected is copying permitted, and only the second piece of permission information is deleted. By the combination of the first piece of permission information and the second piece of permission information as described above, it is possible to realize an embedding method whereby the detection and deletion of the permission information are performed easily, but the unauthorized embedding of permission information is difficult to perform. The first embedding method herein may be the method same as, or different from, the method for embedding the prohibition information.

Examples of the method constituting the first piece of permission information and the second piece of permission information include a method in which either the result of the conversion processing of the code M by a conversion factor or the conversion factor is set to be the first piece of permission information, and the remaining result or conversion factor is set to be the second piece of permission information. Herein, any conversion processing method may be used as long as it is a process such that the result of the conversion processing varies depending on the value of its conversion factors. Examples of such a conversion method include arithmetic operations such as addition, subtraction, multiplication, or division using the conversion factors, a logical operation using the conversion factor, an encryption using the conversion factor as a key, a delay process wherein the conversion factor is set as the amount of delay, and the like. It is particularly preferable to employ conversion processing such that it is difficult to derive a conversion factor from the code M and the conversion result. This conversion method has an effect of increasing tamper resistance. Such an effect can be realized by keeping the method for the conversion processing secret.

Embodiment 2

In Embodiment 2 of the present invention, a data control system for realizing the data control method described in Embodiment 1; and a device for embedding data control information and a device for detecting data control information in said system are described.

Figure 6:
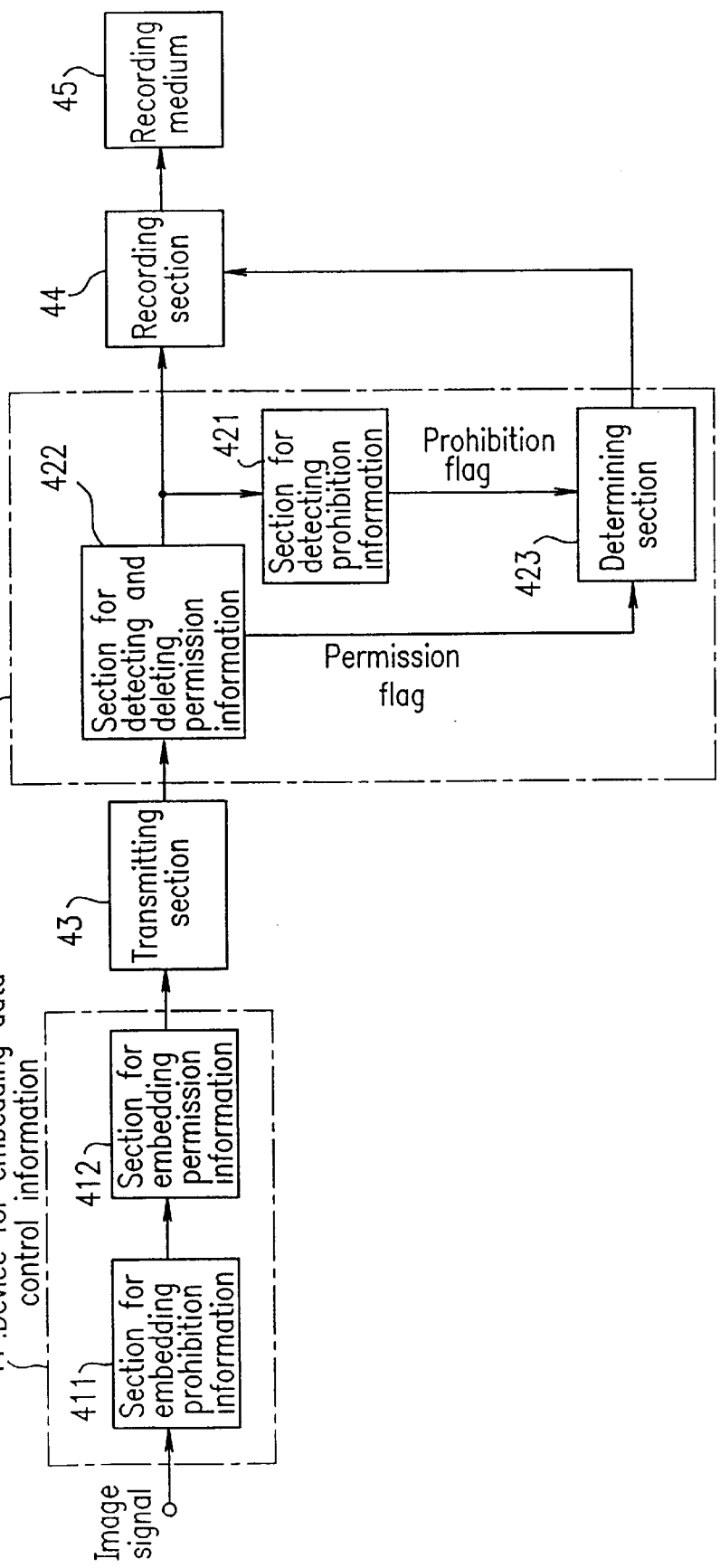
FIG. 6 is a view for illustrating the structure of a data control system according to Embodiment 2 of the present invention.

FIG. 6 is a view for illustrating the structure of the data control system according to Embodiment 2 of the present invention. The data control system includes: a device 41 for embedding data control information (hereinafter, referred to simply as an "embedding device"); a device 42 for detecting data control information (hereinafter, referred to simply as a "detecting device"); a transmitting section 43; a recording section 44; and a recording medium 45. An image signal is input to the embedding device 41, and copy control information is embedded in the image signal. Thereafter, the image signal in which the copy control information is embedded is output to the transmitting section 43.

Examples for the transmission method by the transmitting section 43 include digital transmission or analog transmission by means of radio utilizing a satellite or a ground wave, and digital transmission or analog transmission by means of wire utilizing a telephone line, a coaxial cable, a twisted pair cable, an optical cable, or the like. In addition, a digital or analog recording medium such as a magnetic disk, an optical disk, a CD, a DVD, a DVC, a VCR, or the like is also considered to be the transmitting section 43 since the image signal is reproduced from the recording medium as a bit stream.

The image signal which is transmitted or reproduced via the transmitting section 43 is input to the. detecting device 42. In the detecting device 42, the copy control information is detected, and a recording permission/prohibition flag indicating whether or not the copying is permitted and image information are output from the detecting device 42. This information is input to the recording section 44.

In the case where the recording permission/prohibition flag indicates the permission to copy, the recording section 44 allows the recording medium 45 to record the image information. In the case where the recording permission/prohibition flag indicates copying is prohibited, no recording is performed by the recording section 44. The recording medium 45 may be any medium as long as it performs the recording of data. Examples of the recording medium 45 include a magnetic disk, an optical disk, a CD, a DVD, a DVC, a VCR, and the like.

The embedding device 41 includes a section 411 for embedding prohibition information and a section 412 for embedding permission information.

In the embedding device 41, if one-time-copy-permitting information or copy-prohibiting information is to be embedded, section 411 for embedding prohibition information embeds the prohibition information in the input image signal. The process for embedding the prohibition information is the same as that described in the step S2 in FIG. 2. Thereafter, in the case where copying is permitted once, section 412 for embedding permission information embeds the permission information in the image signal. The operation of section 412 for embedding permission information will be described later.

According to the above-described operation of the embedding device 41, no information is embedded in the image in the case of a copy free image; the prohibition information and the permission information are embedded in an image in the case where copying of the image is permitted once; and the prohibition information is embedded in an image in the case where copying of the image is prohibited.

The detecting device 42 includes a section 421 for detecting prohibition information, a section 422 for detecting and deleting permission information, and a determining section 423.

In the detecting device 42, section 422 for detecting and deleting prohibition information performs detection and deletion of the permission information from the image signal. In the case where the permission information is detected, a permission flag indicating 1 is output. In the case where the permission information is not detected, the permission flag indicating 0 is output. The operation of section 422 for detecting and deleting permission information will be described later.

When the image signal is input to section 421 for detecting prohibition information from section 422 for detecting and deleting permission information, section 421 for detecting prohibition information examines whether or not the prohibition information is embedded. If the prohibition information is detected, a prohibition flag indicating 1 is output. If the prohibition information is not detected, the prohibition flag indicating 0 is output. The values of the permission flag and the prohibition flag are input to the determining section 423. In the case where the permission flag is 1, or the prohibition flag is 0, determining section 423 outputs the recording permission/prohibition flag indicating permission to copy. In the case where the permission flag is 0 and the prohibition flag is 1, the recording permission/prohibition flag indicating that copying is prohibited is output by determining section 423.

By the above-described operation of the detecting device 42, the image in which the permission information is embedded is allowed to be copied after the permission information is deleted. For the image in which neither the permission information nor the prohibition information is embedded, copying of the image is permitted. For the image in which no permission information is embedded and the prohibition information alone is embedded, copying of the image is prohibited.

Next, the structures and operations of section 412 for embedding permission information and section 422 for detecting and deleting permission information will be described with reference to FIGS. 7 and 8.

Figure 7:
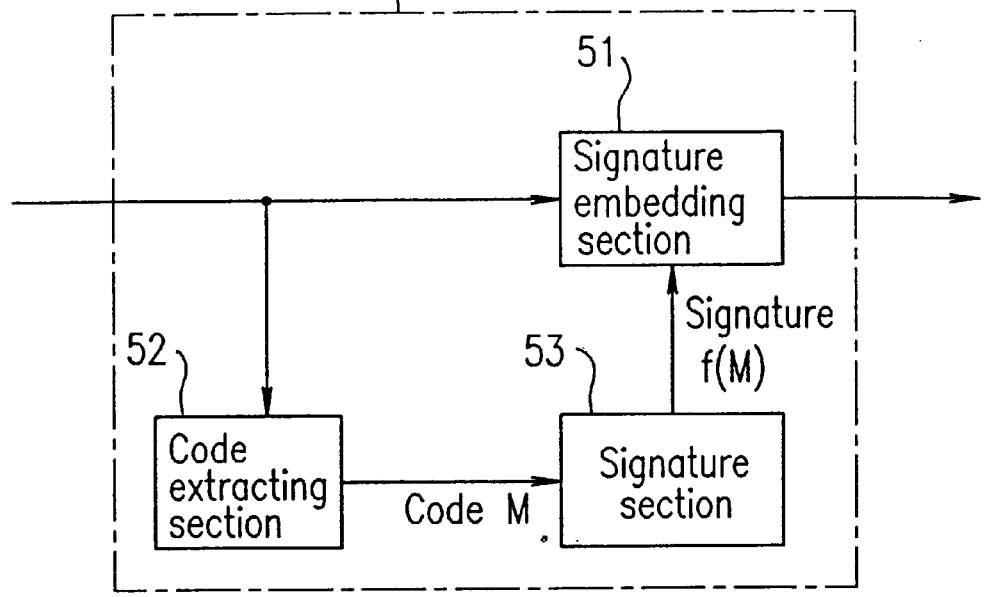
FIG. 7 is a view for illustrating the structure of a method for embedding permission information in the data control system shown in FIG. 6.

As shown in FIG. 7, section 412 for embedding permission information includes a section 51 for embedding a signature (hereinafter, referred to as "signature embedding section"), a section 52 for extracting a code (hereinafter, referred to as "code extracting section"), and a signature section 53.

In section 412 for embedding permission information, the code extracting section 52 generates a code M which can be uniquely derived from the image signal. Then, the code M is output to signature section 53. Thereafter, signature section 53 converts the code M to the digital signature f(M). The digital signature f(M) is then output to signature embedding section 51. Subsequently, signature embedding section 51 embeds the digital signature f(M) in the image signal. In the case where the permission information is not to be embedded, the process for embedding the digital signature f(M) is not performed. Herein, the method for generating the code M in code extracting section 52, the method for generating the digital signature f(M) in signature section 53, and the method for embedding the signature in signature embedding section 51 are the same as the processes at steps S21, S22, and S23 in FIG. 3, respectively.

Figure 8:
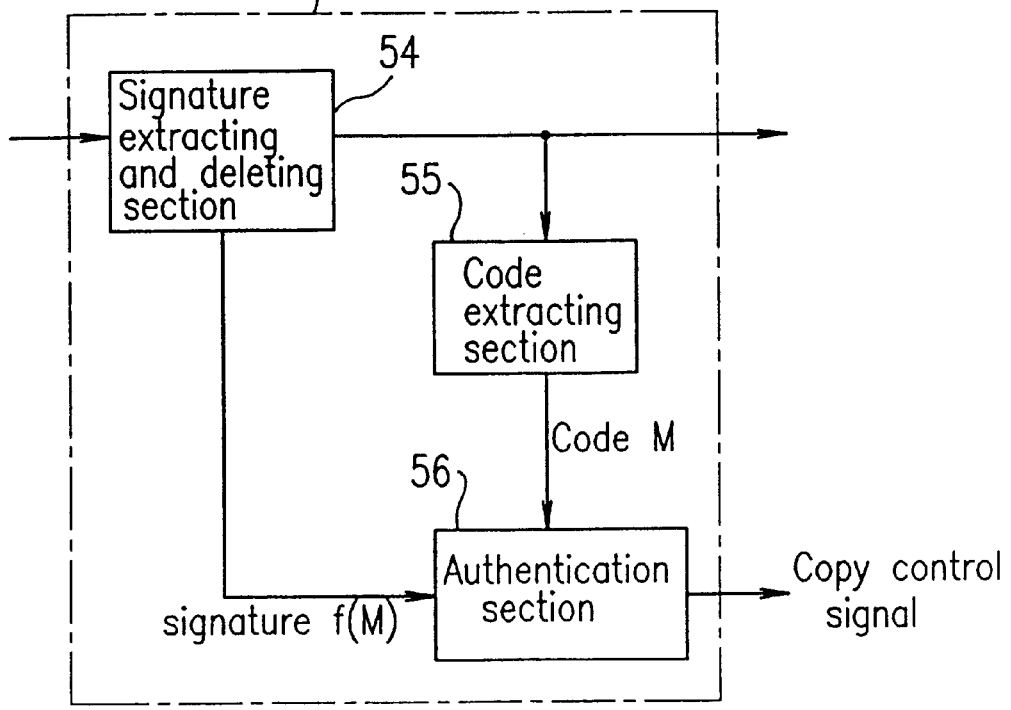
FIG. 8 is a view for illustrating the structure of a method for detecting the permission information in the data control system shown in FIG. 6.

As shown in FIG. 8, section 422 for detecting and deleting permission information includes section 54 for extracting and deleting a signature (hereinafter, referred to as "signature extracting and deleting section"), section 55 for extracting a code (hereinafter, referred to as "code extracting section"), and authentication section 56.

In section 422 for detecting and deleting permission information, the signature extracting and deleting section 54 extracts the digital signature f(M) from the image signal and deletes at least part of the digital signature f(M) from the image signal. Next, code extracting section 55 generates the code M from the image signal in the same manner as that of code extracting section 52. The code M is then output to authentication section 56. Thereafter, authentication section 56 authenticates the digital signature f(M) based upon the code M, and outputs the recording permission/prohibition flag indicating whether recording is permitted. If the digital signature f(M) is not authenticated, the recording permission/prohibition flag indicating a prohibition against recording is output. Herein, the method for extracting the signature in the signature extracting and deleting section 54, the method for generating the code M in the code extracting section 55, and the authentication method in the authentication section 56 are the same as those described with reference to FIG. 5, respectively.

As described above, according to Embodiment 2 of the present invention, in addition to controlling the prohibition and permission to copy, it is possible to realize control such that copying is permitted only once. Therefore, it is possible to realize a data control system, and a device for embedding data control information and a device for detecting the data control information in said system, which make tampering more difficult to conduct as compared to the conventional method.

In Embodiment 2 of the present invention, the method for realizing control such that copying is permitted only once is described. However, it is also possible to realize control such that copying is permitted N times by embedding N pieces of permission information (N is a natural number greater than or equal to 1) upon embedding copy control information, and deleting only one piece of permission information regardless of the number of pieces of permission information found upon detection.

Moreover, a method for embedding copy prohibition information and a method for detecting copy prohibition information are described above. Similarly, it is also possible to realize a method for embedding reproduction prohibition information and a method for detecting the reproduction prohibition information. Thus, control for reproduction can be performed. Furthermore, it is possible to simultaneously realize control of copying and control of reproduction.

Although the embedding device 41 has the structure as shown in FIG. 6 in Embodiment 2 of the present invention, the structure thereof is not limited thereto. The positions of section 411 for embedding prohibition information and section 412 for embedding permission information may be switched. The embedding device may have any structure such that the device embeds at least the prohibition information for an image whose copying is prohibited, and embeds both of the prohibition information and the permission information for an image whose copying is permitted once.

Although the detecting device 42 has the structure as shown in FIG. 6, the structure thereof is not limited thereto.

For example, the image signal input to section 422 for detecting and deleting permission information may be directly input to section 421 for detecting prohibition information. Also, the detecting device 42 may have the structure such that section 422 for detecting and deleting permission information is separated into a device for detecting permission information and a device for deleting the permission information, or the like. The detecting device 42 may have any structure such that copying is permitted upon the detection of the permission information and the permission information is deleted, and copying is prohibited if the prohibition information is detected.

Although the digital signature based on the code M which can be uniquely derived from an image is used as the permission signal in the embodiments described above, the permission signal is not limited thereto. Any embedding method can be used. Specifically, without disclosing the embedding method to user B, only the deletion method and the detection method are disclosed. If a method in which the embedding method cannot be guessed from the deletion method or the detection method, a method in which the calculation amount in the embedding process is greater than that of the deletion or detection process, or a method using a large complicated circuit, or the like is employed, it is possible to further increase the tamper resistance. By producing the permission information based on the code M which can be uniquely obtained from the image, an image can have one-to-one correspondence with the permission information. This makes the unauthorized production of the permission information difficult.

Other examples of the method for embedding the permission information include a method in which permission information consists of a first piece of permission information and a second piece of permission information; and the first piece of permission information is embedded in an image using a first embedding method, and the second piece of permission information is simultaneously embedded in the image using a second embedding method. Herein, an embedding method which makes the deletion of the embedded information difficult to perform, i.e., the same method as used for embedding the prohibition information, is used as the first embedding method. On the other hand, a method in which the permission information is visibly embedded in the edge of the image and thus the deletion thereof can be easily performed is used as the second embedding method. Regarding the copying of the image, only when both of the first piece of permission information and the second piece of permission information are detected is copying permitted, and only the second piece of permission information is deleted. By the combination of the first piece of permission information and the second piece of permission information as described above, it is possible to realize an embedding method whereby the detection and deletion of the permission information are performed easily, but the unauthorized embedding of permission information is difficult to perform. The first embedding method herein may be the method same as, or different from, the method for embedding the prohibition information.

Examples of the method constituting the first piece of permission information and the second piece of permission information include a method in which either the result of the conversion processing of the code M by a conversion factor or the conversion factor is set to be the first piece of permission information, and the remaining result or conversion factor is set to be the second piece of permission information. Herein, any conversion processing method may be used as long as it is a process such that the result of the conversion processing varies depending on the value of its conversion factors. Examples of such a conversion method include arithmetic operations such as addition, subtraction, multiplication, or division using the conversion factors, a logical operation using the conversion factor, an encryption using the conversion factors as a key, a delay process wherein the conversion factor is set as the amount of delay, and the like. It is particularly preferable to employ conversion processing such that it is difficult to derive a conversion factor from the code M and the conversion result. This conversion method has an effect of increasing tamper resistance., Such an effect can be realized by keeping the method for the conversion processing secret.

In the above description of Embodiments 1 and 2, when status is copy-free, method for embedding date control information or device for embedding data control information does not embed data control information. However, the present invention is not limited thereto. When status is copy-free, it can embed information that denotes copy-free in the data.

In the above description of Embodiments 1 and 2, method for detecting data control information or device for detecting data control information permits copy when data control information is not detected. However, the present invention is not limited thereto. When it does not detect data control information, it can prevent data from copying. Alternatively, when it detects information that denotes copy-free, it can permit the copying of the data.

As described above, according to the present invention, in addition to controlling copy-free permission and the prohibition of copying, it is possible to realize control such that copying is permitted only N times when the permission information is detected in the data. Also, it is possible to realize a data control method which makes tampering difficult to conduct.

According to one embodiment of the present invention, since the producer of the data embeds the permission information in the data using a digital signature, it is impossible for a person who accesses the data to tamper with the permission information.

According to one embodiment of the present invention, in addition to controlling copy-free permission and the prohibition against copying, it is possible to embed information which permits copying N times.

According to one embodiment of the present invention, since the permission information is generated based on the code which can be uniquely derived from the data, the permission information has a one-to-one correspondence with the data. Thus, it is possible to mike tampering with the permission information difficult.

According to one embodiment of the present invention, it is possible to limit the number of copies to N when data in which the permission information is inserted is input, and it is possible to prohibit copying when data in which the prohibition information alone is inserted.

According to one embodiment of the present invention, only when the permission information based on a code which can be uniquely derived from the data is detected is copying permitted.

According to one embodiment of the present invention, only when the digital signature is authenticated is copying permitted.

According to one embodiment of the present invention, when the permission information is detected from data, data can be recorded on a recording medium.

According to one embodiment of the present invention, when the prohibition information alone is detected in data, the processing of the data is prohibited; and when the permission information is detected, it is possible to permit the processing of the data N times.

According to one embodiment of the present invention, in addition to controlling the prohibition of data processing, it is possible to embed information which permits data processing N times.

According to one embodiment of the present invention, when data in which the permission information is inserted is input, the number of times the data can be processed can be limited to N; and when data in which the prohibition information alone is inserted is input, data processing can be prohibited.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data control method comprising the steps of:
    A) embedding prohibition information and N pieces of permission information in data (N is a natural number), wherein copying of the data is to be permitted N times; and
    B) detecting the prohibition and permission information prior to the copying of the data,
        wherein in the case where the permission information is detected from the data prior to the copying of the data, at least one of the N pieces of permission information in the data is invalidated, and then the copying of the data is permitted, while the remaining pieces of permission information remain valid within the data without necessitating that the remaining pieces of permission information be reembedded in the data.

2. A data control method according to claim 1, wherein the permission information is a digital signature f(M); and the digital signature f(M) is derived based on a digital code M which is extracted from the data.

3. A method for embedding data control information comprising the step of:
    embedding prohibition information and N pieces of permission information in data (N is a natural number), wherein the copying of the data is permitted N times without necessitating that the pieces of permission information be reembedded in the data upon the data being copied.

4. A method for embedding data control information according to claim 3, wherein the permission information is a digital signature f(M) for a digital code M which is uniquely derived from the data.

5. A method for detecting data control information comprising the step of:
    detecting a piece of predetermined permission information embedded in data prior to copying of the data,
    wherein in the case where the piece of predetermined permission information is detected from the data prior to the copying of the data, the piece of predetermined permission information is invalidated, and then the copying of the data is permitted while remaining pieces of permission information remain valid within the data without necessitating that the remaining pieces of permission information be reembedded in the data.

6. A method for detecting data control information according to claim 5, wherein the detecting step comprises:
    authenticating a digital signature f(M) in the data based on a digital code M which is derived from the data,
    wherein in the case where the digital signature f(M) in the data is authenticated prior to copying of the data, the copying of the data is permitted, and wherein in the case where the digital signature f(M) in the data is not authenticated prior to the copying of the data, the copying of the data is prohibited.

7. A device for embedding data control information, comprising:
    a section for embedding prohibition information, which embeds prohibition information indicating at least a prohibition against copying data in the data; and
    a section for embedding permission information, which embeds N pieces of permission information in the data along with the embedding of the prohibition information by the section for embedding prohibition information where the copying of the data is to be permitted N times without necessitating that the pieces of permission information be reembedded in the data upon copying of the data, wherein N is a natural number.

8. A device for embedding data control information according to claim 7, wherein the section for embedding permission information has a code extracting section for extracting a digital code M from the data.

9. A device for embedding data control information according to claim 8, wherein the section for embedding permission information includes: a signature section for generating a digital signature f(M) based on the digital code M which is extracted by the code extracting section and a first public key held by a producer of the data; and a signature embedding section for embedding the digital signature f(M) generated by the signature section in the data as the permission information.

10. A device for detecting data control information which extracts prohibition information and permission information embedded in data, comprising:
    a permission information detecting section for detecting the permission information from the data;
    a permission information invalidating section for invalidating the permission information in the data;
    a prohibition information detecting section for detecting the prohibition information from the data; and
    a determining section which sets a copy permission/prohibition flag to be in a copy permissive state and then outputs the flag in the case where the permission information is detected by the permission information detecting section; and sets the copy permission/prohibition flag to be in a copy prohibited state and then outputs the flag in the case where the permission information is not detected by the permission information detecting section, and the prohibition information is detected by the prohibition information detecting section,
    wherein the permission information invalidating section invalidates a portion of the permission information when the copy permission/prohibition flag is set to a copy permissive state while a remaining portion of the permission information remains valid within the data without necessitating that the remaining portion of permission information be reembedded in the data.

11. A device for detecting data control information according to claim 10, wherein the permission information detecting section has a code extracting section for extracting a digital code M from the data.

12. A device for detecting data control information according to claim 11, wherein the permission information detecting section includes: a signature extracting section for extracting a digital signature f(M) which is embedded in the data; and an authentication section which generates a digital signature f(M) based on the digital code M extracted by the code extracting section and a second public key, compares the generated digital signature f(M) with the digital signature f(M) extracted by the signature extracting section, and validates a copy permission flag and outputs the flag if the digital signature f(M) is authenticated.

13. A device for recording data on a recording medium, comprising:

a permission information detecting section for detecting the permission information from the data;

a permission information invalidating section for invalidating the permission information in the data;

a prohibition information detecting section for detecting the prohibition information from the data;

a determining section which sets a copy permission/prohibition flag to be in a copy permissive state and then outputs the flag in the case where the permission information is detected by the permission information detecting section; and sets the copy permission/prohibition flag to be in a copy prohibited state and then outputs the flag in the case where the permission information is not detected by the permission information detecting section, and the prohibition information is detected by the prohibition information detecting section; and a data recording section which records the data in the case where the copy permission/prohibition flag is set to be in the copy permissive state by the determining section, and does not record the data in the case where the copy permission/prohibition flag is set to be in the copy prohibited state by the determining sections, wherein the permission information invalidating section invalidates a portion of the permission information when the copy permission/prohibition flag is set to a copy permissive state while a remaining portion of the permission information remains valid within the data without necessitating that the remaining portion of permission information be reembedded in the data.

14. A device for recording data according to claim 13, wherein the permission information detecting section has a code extracting section for extracting a digital code M from the data.

15. A data control method comprising the steps of:

A) embedding prohibition information and N pieces of permission information in data (N is a natural number), wherein processing of the data is to be permitted N times; and B) detecting the permission and prohibition information prior to the processing of the data, wherein in the case where the permission information is detected from the data prior to the processing of the data, at least one of the N pieces of permission information in the data is invalidated, and then the processing of the data is permitted, while the remaining pieces of permission information remain valid within the data without necessitating that the remaining pieces of permission information be reembedded in the data.

16. A method for embedding data control information comprising the step of:

embedding prohibition information and N pieces of permission information in data (N is a natural number), wherein the processing of the data is to be permitted N times without necessitating that the pieces of permission information be reembedded in the data upon the data being processed.

17. A method for detecting data control information comprising the following step of:

detecting a piece of predetermined permission information embedded in data prior to processing of the data, wherein in the case where the piece of predetermined permission information is detected from the data prior to the processing of the data, the piece of predetermined permission information is invalidated so as to permit the processing of the data while remaining pieces of permission information remain valid within the data without necessitating that the remaining pieces of permission information be reembedded in the data.

18. A device for embedding data control information, comprising:

a section for embedding prohibition information, which embeds prohibition information indicating prohibition against processing of data in the data; and a section for embedding permission information, which embeds N pieces of permission information in the data along with the embedding of the prohibition information by the section for embedding prohibition information where the processing of the data is to be permitted N times without necessitating that the pieces of permission information be reembedded in the data upon processing of the data, wherein N is a natural number.

19. A device for detecting data control information which extracts prohibition information and permission information embedded in data, comprising:

a permission information detecting and deleting section which, in the case where N pieces of permission information (N is a natural number) are detected from the information, invalidates at least one of the N pieces of permission information in the data, validates a permission flag, and outputs the flag;

a prohibition information detecting section which validates a prohibition flag and outputs the flag in the case where the prohibition information is detected from the data; and a determining section which sets a permission/prohibition flag to be in a permissive state and then outputs the flag when the permission flag is valid or the prohibition flag is not valid, and sets the permission/prohibition flag to be in a prohibited state and then outputs the flag when the permission flag is invalid and the prohibition information is valid, wherein the permission information detecting and deleting section invalidates the at least one of the N pieces of permission information while the remaining pieces of permission information remain valid within the data without necessitating that the remaining pieces of permission information be reembedded in the data.

* * * * *

UNITED STATES PATENT AND TRADEMARK OFFICE
CERTIFICATE OF CORRECTION

PATENT NO. : 6,434,538 B1  Page 1 of 1
DATED : August 13, 2002
INVENTOR(S) : Susumu Ibaraki and Noboru Katta It is certified that error appears in the above-identified patent and that said Letters Patent is hereby corrected as shown below:

<u>Title page,</u>
Item [54], Title, insert -- METHOD -- before "FOR".

<u>Column 21,</u>
Line 25, "sections" should be -- section --.

Signed and Sealed this

Eighteenth Day of February, 2003

JAMES E. ROGAN
*Director of the United States Patent and Trademark Office*